United States Patent
Gudmestad

[15] 3,653,412
[45] Apr. 4, 1972

[54] CONVEYOR TRANSFER UNIT

[72] Inventor: Ragnar Gudmestad, West Allis, Wis.

[73] Assignee: Artos Engineering Company, New Berlin, Wis.

[22] Filed: June 15, 1970

[21] Appl. No.: 46,391

[52] U.S. Cl. .................................140/1, 29/33 M, 81/9.51
[51] Int. Cl. .......................................................B21f 15/00
[58] Field of Search ............140/1; 29/33 M, 203 DT, 630 A; 81/9.51

[56] References Cited

UNITED STATES PATENTS

| | | | |
|---|---|---|---|
| 3,267,556 | 8/1966 | Scharf | 81/9.51 |
| 2,688,133 | 9/1954 | Berg | 29/33 |
| 2,768,425 | 10/1956 | Andren | 29/630 |
| 3,029,494 | 4/1962 | Andren | 81/9.51 |

Primary Examiner—Lowell A. Larson
Attorney—James E. Nilles

[57] ABSTRACT

An apparatus for transferring a pair of parallel electric wire lengths from a measuring, cutting and stripping machine to a precise location with respect to a first terminal applicator and a second terminal applicator. The apparatus includes a pivotally mounted conveyor assembly in which the conveyor end closest to the cutting and stripping machine is movable in the vertical plane up into the path of the horizontal wire in the cutting and stripping machine, and down from said path a like amount. A plurality of wire length carrying clamps are mounted on the conveyor assembly for lateral movement between a pair of conveyor chains to predetermined positions with respect to the cutting machine and the applicators. A mechanical linkage is operatively connected to coordinate the pivotal movement of the conveyor assembly, the operation of the drive mechanism for the conveyor chains and the opening and closing of the clamps with the operation of the cutting and stripping machine. A wire length gatherer is provided around the end of the conveyor assembly.

29 Claims, 13 Drawing Figures

Fig. 1

Patented April 4, 1972

Inventor:
Ragnar Gudmestad
By: James E. Nilles
Attorney

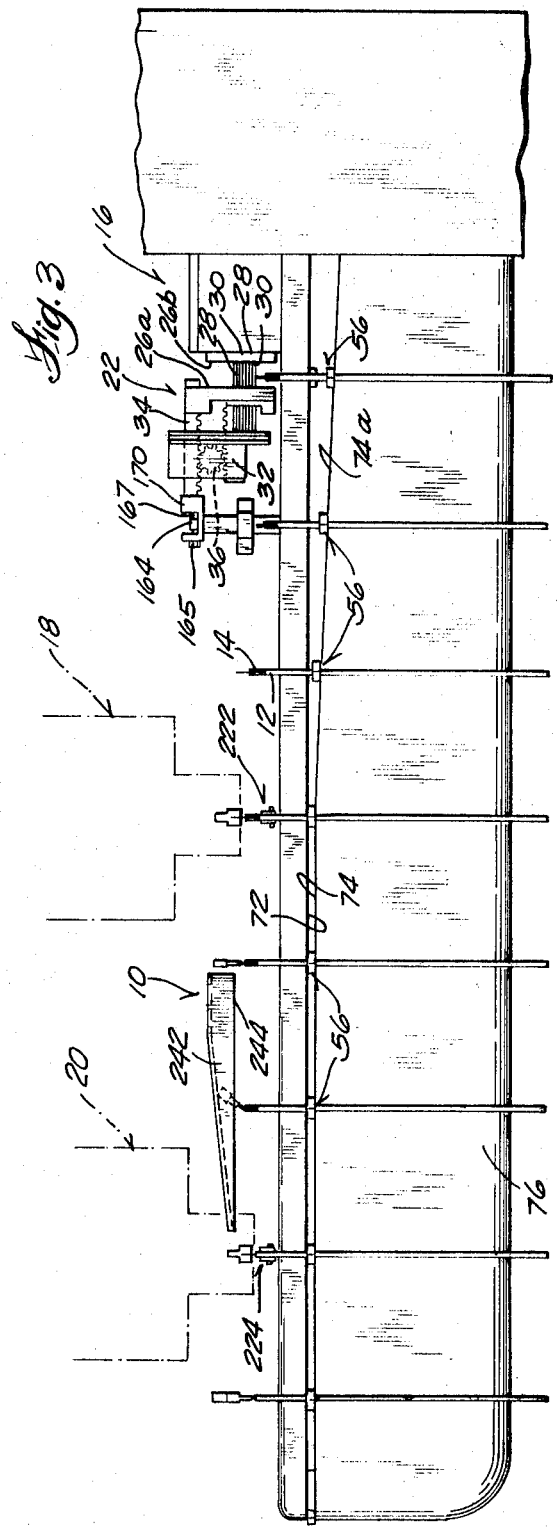

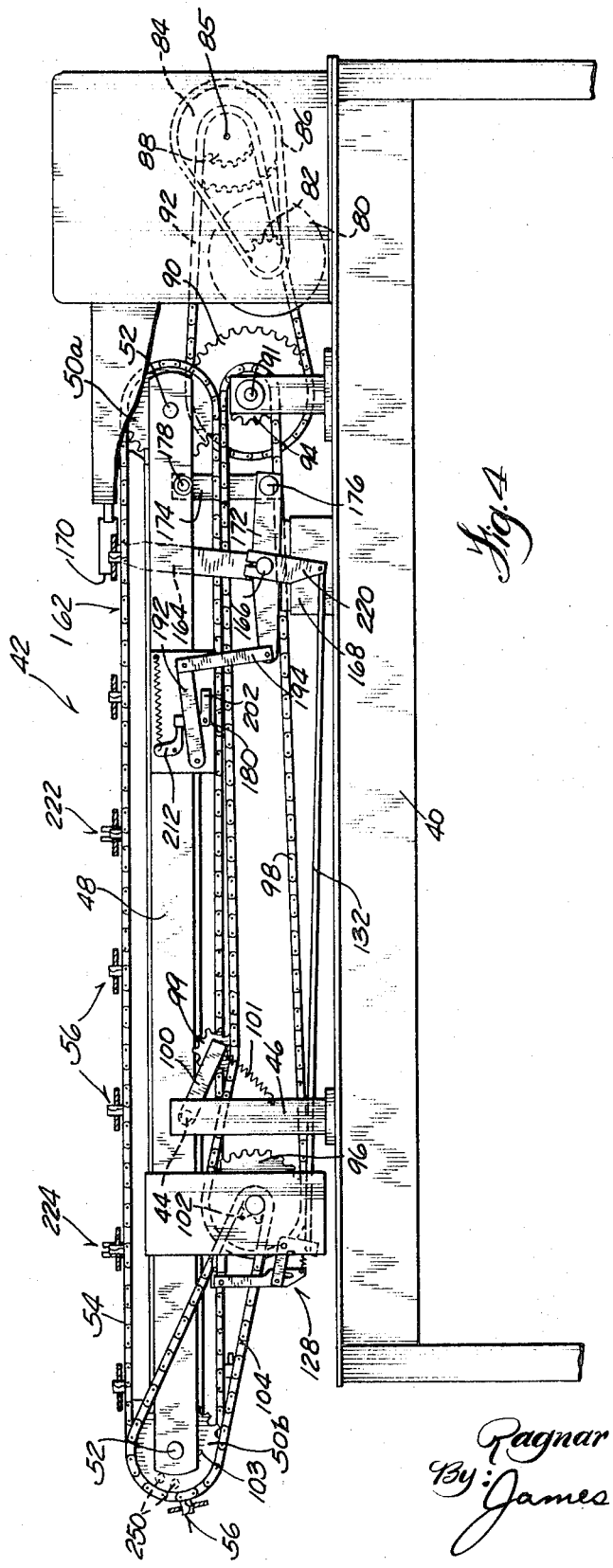

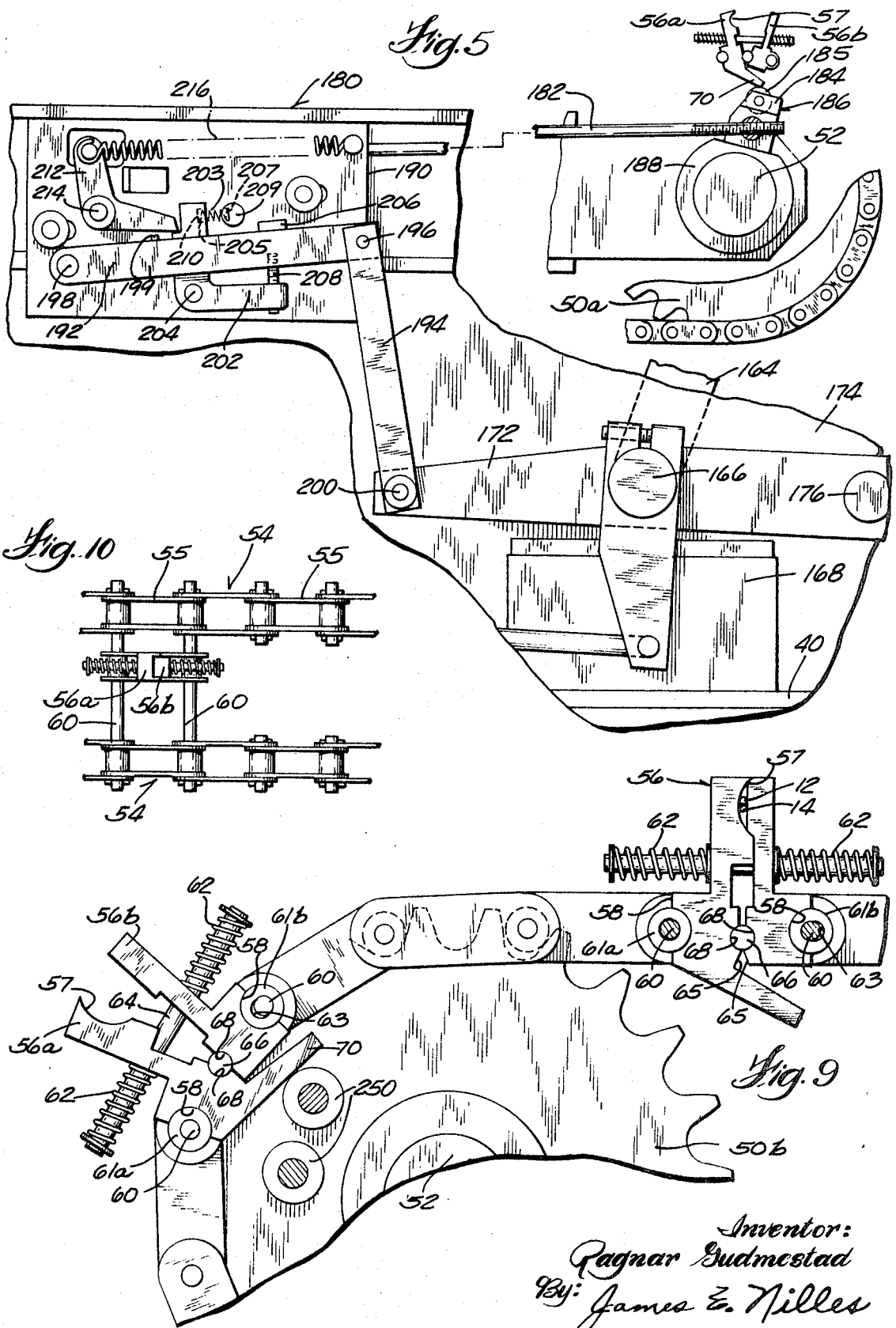

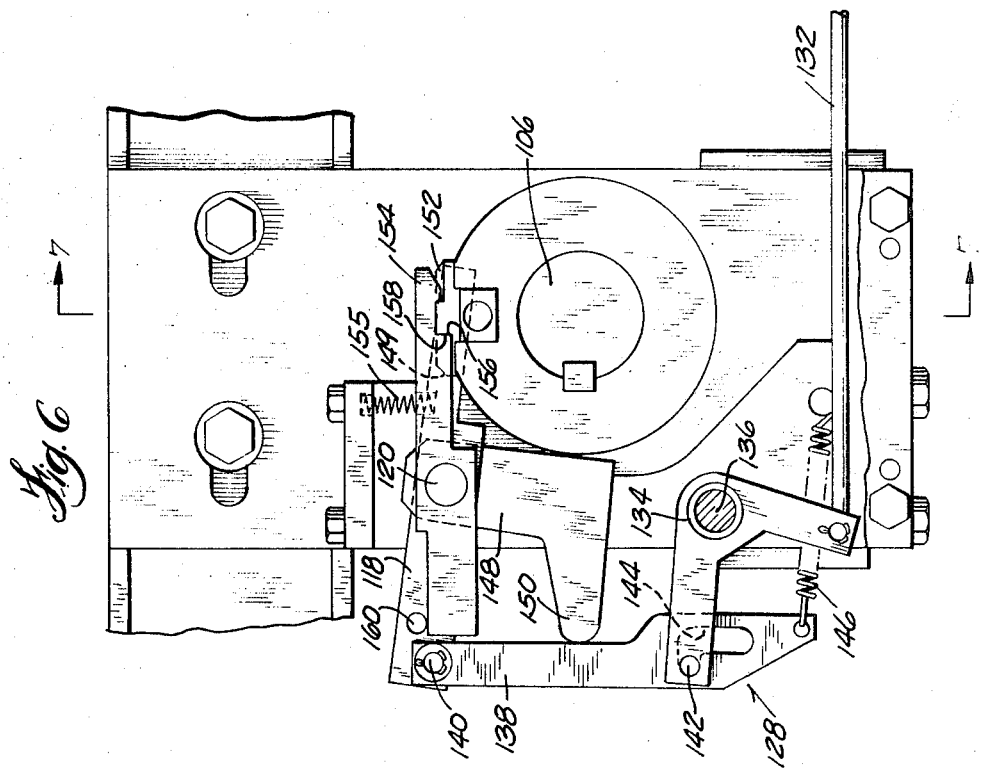
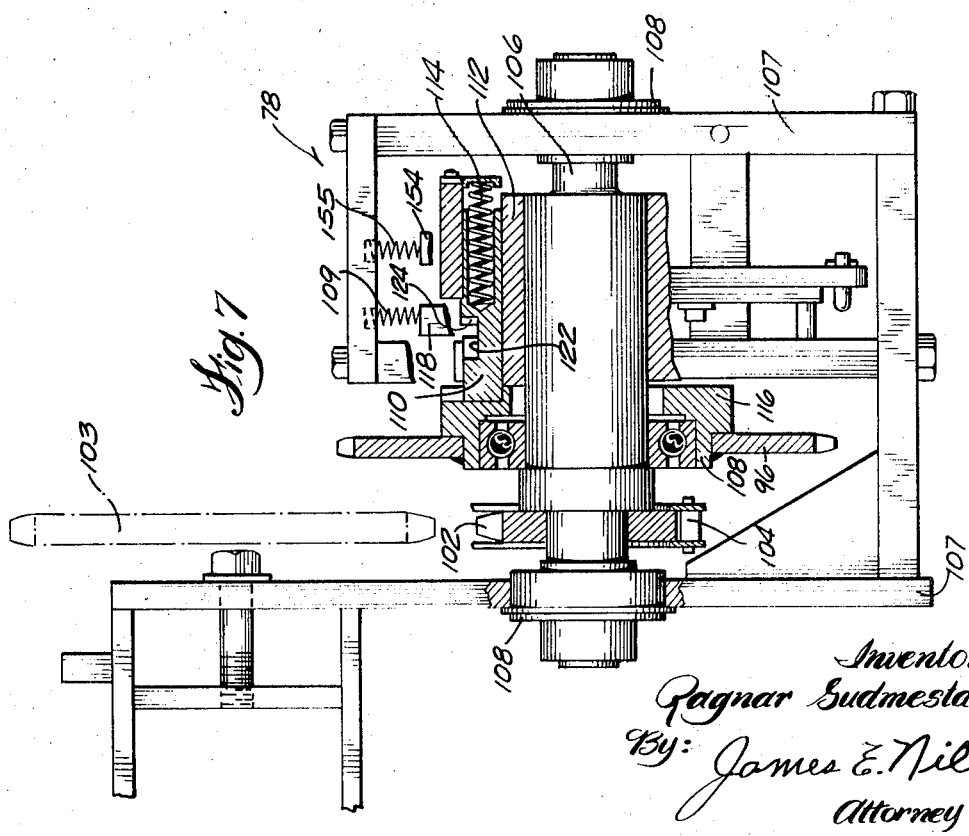

Patented April 4, 1972
3,653,412
6 Sheets-Sheet 6
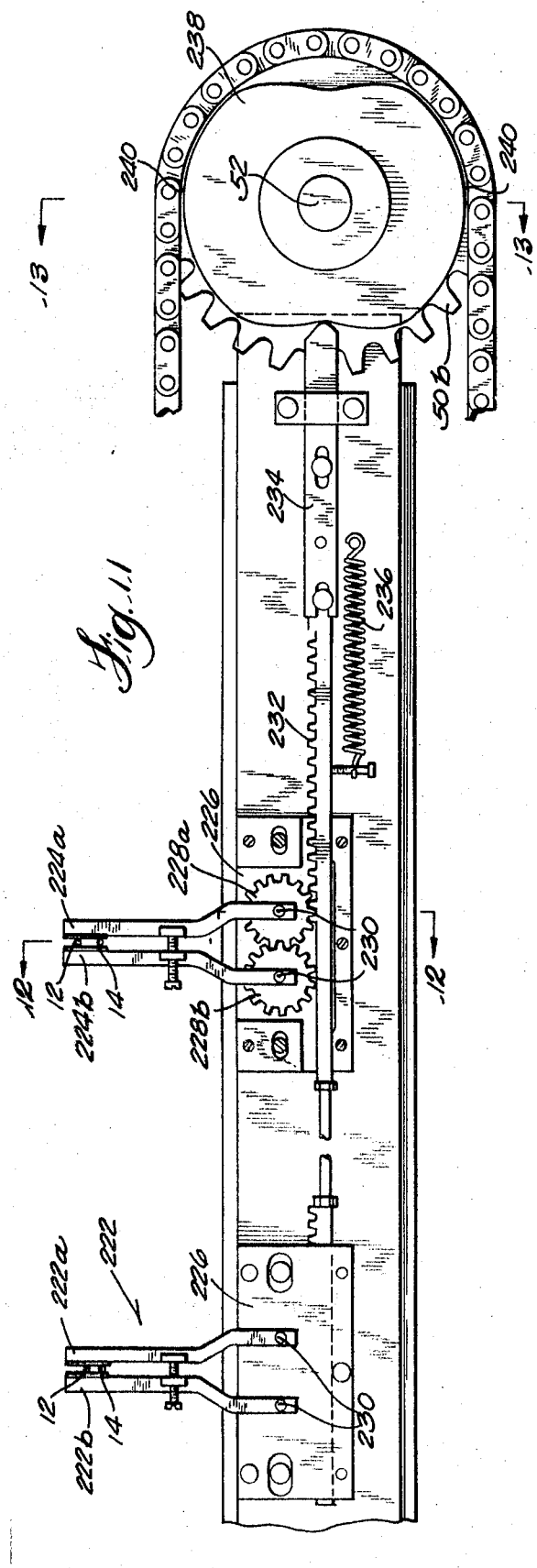
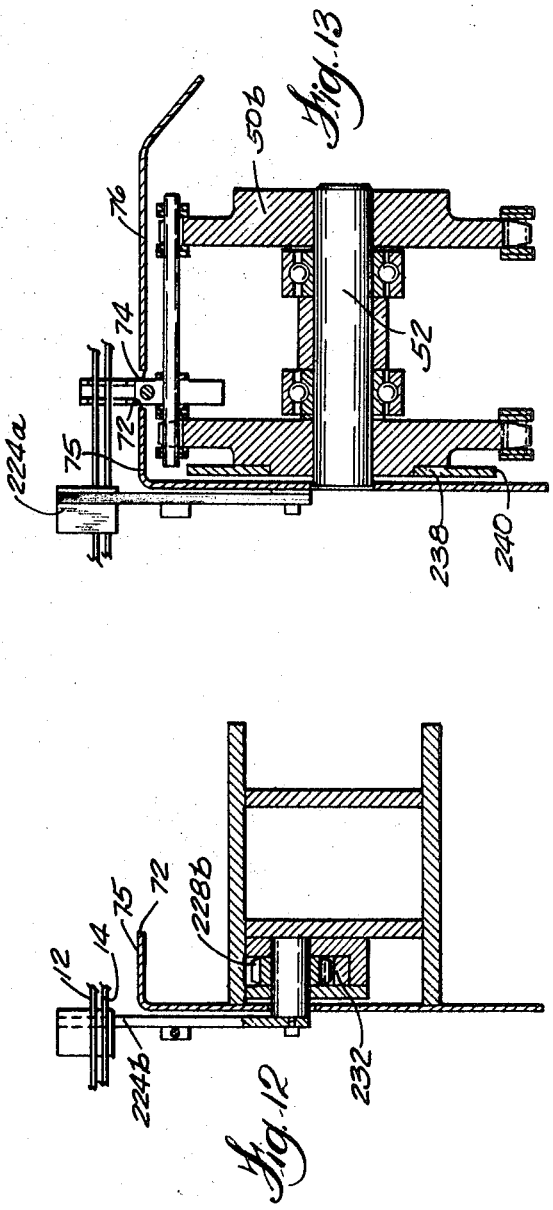
Inventor:
Ragnar Gudmestad
By: James E. Nilles
Attorney

3,653,412

CONVEYOR TRANSFER UNIT

BACKGROUND OF THE INVENTION

Electric wire measuring, cutting and stripping machines of the types shown in U.S. Pat. No. 2,680,394 to Andred, titled "Wire Cutting and Stripping Machine" issued June 8, 1954 and U.S. Pat. No. 2,929,284 to Hagstrand, titled "Multiple Wire Cutter and Stripper" issued Mar. 22, 1960 are used for measuring the length of an electric wire, severing the measured electric wire length, and stripping the insulation from one or both ends of each wire length. The wire lengths are then released making it difficult to pick up the loose wire lengths automatically for movement to the terminal applicators or presses. Generally, the wire lengths are manually inserted into the automatic terminal applicators where electric terminals are secured to the stripped ends of the wire lengths. A number of different types of automatic applicators are presently being used for securing either the double eared or barrel type terminals to the wires further complicating efforts to automatically feed the wire lengths from the cutting and stripping machine to the applicators. All of these applicators require precise positioning of the stripped end of the wire length within the terminal applicator in order to assure positive attachment of the electric terminal to the end of the wire length.

SUMMARY OF THE INVENTION

The apparatus of the present invention provides for the accurate transfer of measured electric wire lengths from a measuring, cutting, and stripping machine to a predetermined location with respect to each of a number of terminal applicators located at spaced intervals from the cutting and stripping machine. This apparatus includes a conveyor assembly having a number of wire length carrying clamps which are mounted for transverse movement between a pair of conveyor chains. A unique clamp mounting arrangement is provided to reduce the amount of movement required to open and close the clamps. The conveyor assembly is mounted for pivotal movement between operative and inoperative positions with respect to the cutting and stripping machine to provide clearance for the movement of the clamps under the wire. The clamps are accurately located at the same point with respect to the electric wire lengths in order to provide for the accurate positioning of the stripped ends of the wire at the applicator. Noise is reduced by using a mechanical linkage assembly to coordinate the movement of the conveyor assembly with the operation of the cutting machine. The linkage assembly provides for the coordination of operation of the apparatus by the mechanical transfer of the motion of the cutting machine to the conveyor assembly. An automatic wire gatherer is provided at the end of the conveyor assembly to collect the wire lengths after application of the electric terminals.

Other objects and advantages will become apparent from the following detailed description when read in connection with the accompanying drawings.

BRIEF DESCRIPTION OF THE DRAWINGS

FIG. 3 is a top view of the cam track for the wire length carrying clamps of the apparatus;

FIG. 4 is a side view of the chain drive arrangement for the apparatus of this invention;

FIG. 5 is an enlarged view, partly broken away of the linkage assembly for actuating the conveyor assembly;

FIG. 6 is an enlarged view, partly broken away showing the pin clutch for intermittently driving the conveyor;

FIG. 7 is a view taken on line 7—7 in FIG. 6 showing the release and stop levers for the pin clutch;

FIG. 8 is a top view of the pin clutch;

FIG. 9 is an enlarged view of the conveyor assembly partly broken away to show the wire length carrying clamps;

FIG. 10 is a top view of part of the conveyors showing one of the wire length carrying clamps mounted on the conveyor;

FIG. 11 is a view of the timing mechanism for the wire length stabilizing clamps;

FIG. 12 is a view taken on line 12—12 of FIG. 11 showing the stabilizing clamps;

FIG. 13 is a view taken on line 13—13 of FIG. 11 showing a cross section of the end of the drive for the stabilizer clamps.

DESCRIPTION OF THE INVENTION

Figure 1:
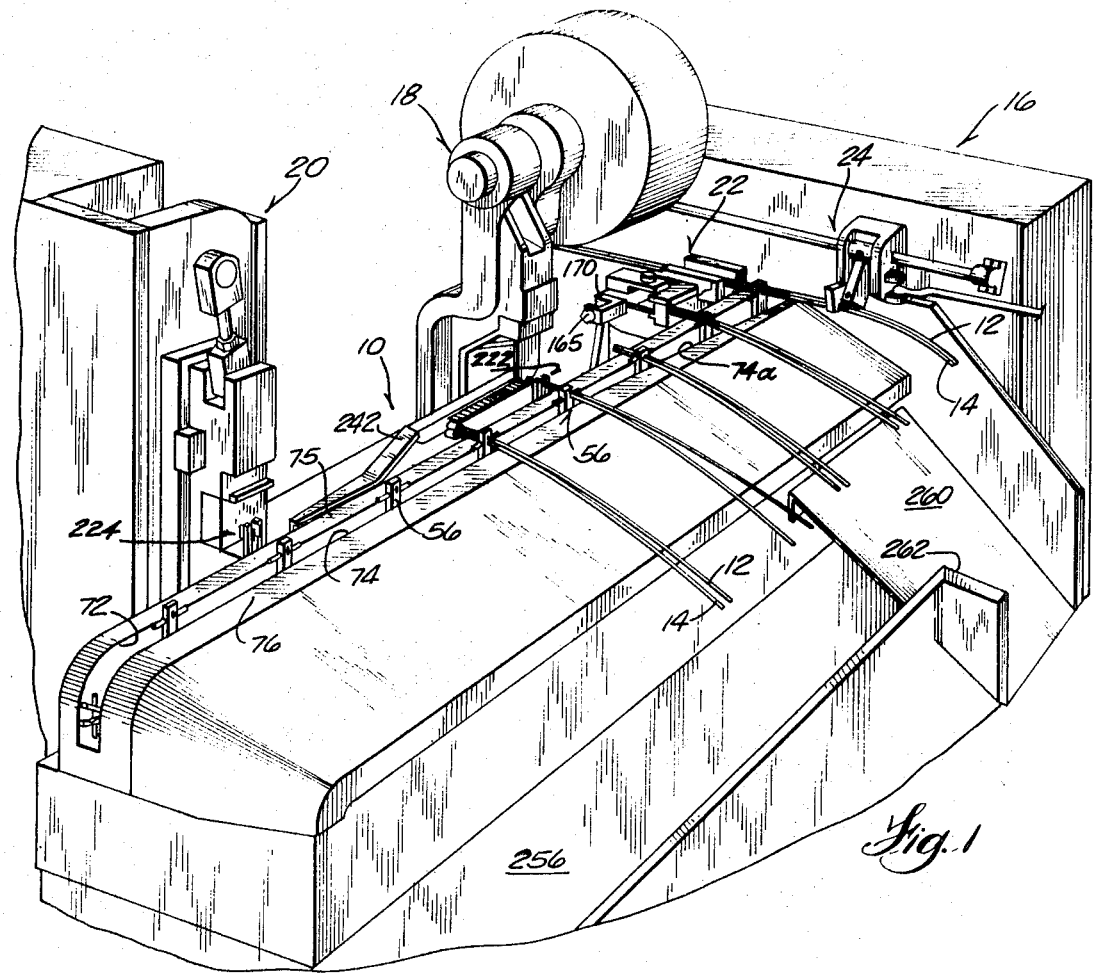
FIG. 1 is a perspective view of the apparatus of the present invention.

The apparatus 10 of the present invention is used to automatically transfer or convey a pair of electric wires 12 and 14 from a measuring, cutting and stripping machine 16 to a precise location with respect to a first electric terminal applicator or press 18 and a second electric terminal applicator or press 20. The terminal applicators 18 and 20 are conventional machines and in this particular embodiment are shown as applicators which are used to attach a double eared type electric terminal to the electric wire lengths. The measuring, cutting and stripping machine 16 is substantially the same as shown in U.S. Pat. Nos. 2,680,394 and 2,929,284. Although the description refers to the carrying of two wires to two terminal applicators, the apparatus can be used to carry a single wire to a single applicator or a number of wires to a number of different applicators.

CUTTING AND STRIPPING MACHINE

Figure 2:
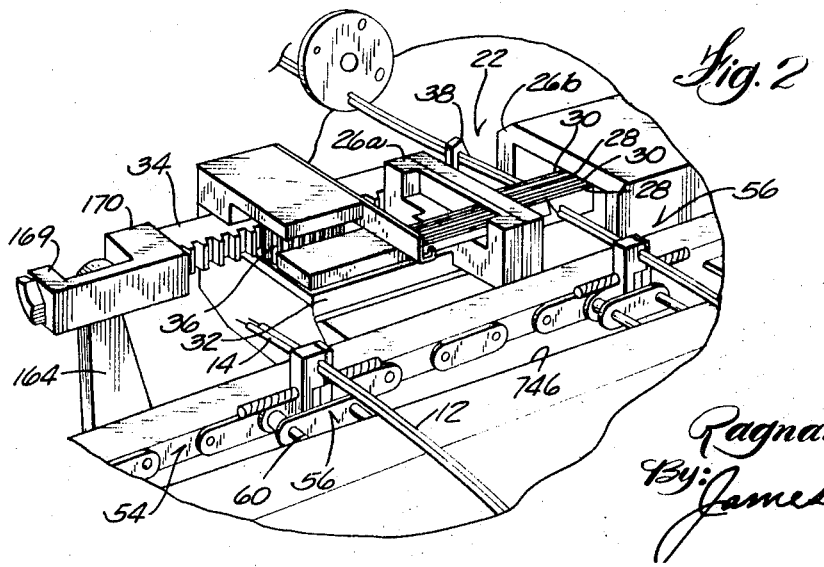
FIG. 2 is an enlarged, perspective view of the connection between the tool holder for the cutting and stripping blades and the linkage assembly for operating the apparatus.

Referring to FIGS. 1, 2 and 3, the cutting and stripping machine 16 generally includes a tool holder 22 and a clamp assemblage 24. The tool holder 22 includes a pair of carriers 26a and 26b each having a number of insulation cutting and stripping blades 28 and wire severing knives 30. The carriers 26a and 26b are moved towards each other by means of racks 32 and 34 which are operatively positioned to engage a pinion gear 36. The carriers 26a and 26b are moved by the timing mechanism as described in the aforementioned U.S. Pat. Nos. 2,680,394 and 2,929,284. The clamp assemblage 24 is used to measure the length of the electric wire which is to be cut by pulling the wire from a source (not shown) through a guide 38 and the tool holder 22. The length of the wire which can be cut on the machine 16 can be varied from 3½ inches in length up to a length of 196 inches. This is 12 times the length of the support arm for the clamp assemblage 24 and is accomplished by the multiple stroke feature in the machine. When the clamp assemblage 24 stops, the carrier 2wa is moved toward the carrier 26b to cut the insulation and to sever the wire lengths 12 and 14. The clamp assemblage 24 is then moved a short distance to strip the cut insulation from the ends of the cut wire lengths 12 and 14. It should be noted that the end of the upper wire length 12 is shown staggered or set back from the end of the lower wire length 14, however the ends may be aligned with each other depending on the type of electric terminals that are to be attached to the electric wire ends.

CONVEYOR ASSEMBLY

In accordance with the invention, the apparatus 10 is used to carry the severed wire lengths 12 and 14 from the cutting and stripping machine 16 and to position the stripped end of the wire length 14 in the first terminal applicator 18 and the end of the wire length 12 in the second terminal applicator 20. More specifically and referring to FIGS. 3 and 4, the apparatus 10 generally includes a frame 40 and a conveyor assembly 42 which is mounted for pivotal movement on a rod 44 supported on the frame 40 by a pair of brackets 46. The conveyor assembly 42 includes a housing 48 and a pair of sprockets 50a and 50b mounted for rotary motion on shafts 52 journalled in each end of the housing 48. Conveyor chains 54 are trained around the sprockets 50a and 50b for movement in a parallel spaced relation on each side of the housing 48.

WIRE CARRYING CLAMP

The electric wire lengths 12 and 14 are advanced or carried from the cutting and stripping machine 16 by means of clamps 56 provided on the conveyor chains 54. In this regard and referring to FIGS. 9 and 10, each of the clamps 56 includes a pair of jaws 56a and 56b each having a curved recess 58 on the outside and a curved recess 68 on the inside. The recesses 58 on the jaws are seated on bushings 61 provided on pins 60 which interconnect the links 55 of the conveyor chains 54 and form the pivot axis for the chain links 55. The jaws are retained on the bushings 61 by means of a pin 66 seated in the recess 68. The pivotal or opening motion of the jaws 56a and 56b is limited by the angle of the surface 65 located below the pivot pin 66. The trailing bushing 61b is provided with an elongate opening 63 to allow sliding of the jaws 56 between the chains. The jaws are biased to a closed position by means of springs 62 mounted on rods 64 which extend through the jaws 56a and 56b. The jaws are pivoted to an open position by engagement of an extension or tail 70 provided on the leading jaw 56a with cam rollers provided on the conveyor assembly, as more particularly described hereinafter.

The wire length or wire lengths carried by the clamps 56 are centered between the jaws and gripped or squeezed tightly by means of an arcuate surface 57 provided in the face of the jaw 56a. This curved surface 57 as seen in FIG. 9, moves the wire to the center and assures that each wire is tightly gripped in the jaws.

Means are provided for accurately locating the clamps 56 with respect to the cutting machine 16 and the applicators 18 and 20. It should be noted that the clamps 56 are transversely or laterally moved on the pins 60 of the conveyor chains 54 as the ends of the wire lengths 12 and 14 are stripped. Such means is in the form of a pair of cam surfaces 72 and 74 provided on the housing members 75 and 76 for the apparatus 10. The cam surface 72 is located a fixed distance from the cutting blades 30 on the tool holder 22, and is also located at a fixed distance from the terminal applicators 18 and 20. The cam surface 74 includes an angled section 74a which is used to move the clamps 56 transversely against the cam surface 72 after the jaws have picked up the severed wire lengths 12 and 14.

In this regard and referring to FIG. 3, it will be noted that the angle section 74a is provided only in the area of the tool holder 22. As more particularly described below, the clamps 56 are closed to grip the electric wires 12 and 14 at about the same time as the wire lengths are severed and move transversely on the pins 60 when the insulation is stripped from the ends of the wire by the final motion of the clamp assemblage 24. The clamps 56 must then be returned to a position bearing against the cam surface 72 in order to obtain an exact location of the clamps 56 with respect to the terminal applicators 18 and 20. The clamps 56 remain in engagement with cam surface 72 when they move into position to pick up wire at the machine 16. Lateral motion of the clamps 56 on the pins 60 to seat the ends of the wire lengths 12 and 14 in barrel type terminals can be accomplished by means other than surface 74 such as a cam or link which is positioned to push the clamps 56 toward an applicator each time the conveyor is stopped.

LINKAGE ASSEMBLY

The movements of the conveyor assembly 42 of the apparatus 10 is coordinated or synchronized with the severing and stripping of the electric wire lengths 12 and 14 by means of a linkage assembly 162 provided on the frame 40. The linkage assembly 162 as seen in FIGS. 2, 4 and 5 includes a rocker arm 164 connected to a shaft 166 which is mounted for pivotal movement on a bracket 168 provided on the frame 40. The upper end of the rocker arm 164 is positioned within a groove 169 in a bracket 170 provided on the end of a rack 34 which is positioned to engage the pinion gear 36 on the cutting machine 16. The rocker arm 164 will pivot the shaft 166 counter clockwise as the rack 34 is moved outward by the camming action of the timing mechanism in the machine 16. Referring to FIGS. 4 and 5, the counter clockwise movement of the rocker arm 164 is transferred to a lever 172 which is secured to the shaft 166. Means are provided for transferring the motion of the lever 172 to the conveyor housing 48 in the form of a link 174 pivotally connected to the lever 172 by a pin 176 and to the housing 48 by a pin 178. It should be noted that the end of the conveyor housing 48 is moved upward as the blades 28 and knives 30 close on the electric wires 12 and 14.

Means are provided on the other end of the lever 172 for tripping the clamps 56 to a closed position to grip the wire lengths 12 and 14 as they are cut and prior to stripping of the insulation from the end of the wire lengths 12 and 14. The wire lengths are picked up or gripped by the clamps 56 prior to stripping because the wires are still held in a fixed position and the distance of the clamps from the cutting blades is a fixed or known distance. Such means, as shown in FIG. 5, is in the form of a clamp trip mechanism 180 provided on the end of the housing 48. The trip mechanism 180 is operatively connected by means of an actuator rod 182 to a clamp release cam assembly 184 which is positioned in the path of motion of the extension 70 on the jaw 56a.

The trip assembly 184 includes a cam roller 185 mounted on a bracket 186 which is secured to a sleeve 188 mounted for rotary motion on the shaft 52 for the conveyor sprockets 50a. The cam roller 185 is normally positioned to engage the extension 70 on the jaw 56a when the clamp 56 is moved to a position to grip the electric wires 12 and 14. The clamp 56 is closed by moving the cam roller 185 out from under the extension 70. This is accomplished by rotating the sleeve 188 about the shaft 52 until the cam 185 clears the end of the extension 70. The springs 62 will then snap the jaws 56a and 56b together on the wires 12 and 14.

CLAMP TRIP MECHANISM

The trip mechanism 180 includes a plate 190 mounted on the side of the housing 48 and a pair of links 192 and 194 operatively connected to the lever 172. The link 192 is pivotally connected to the plate 190 by a pin 198 and to the link 194 by a pin 196. The link 194 is connected to the lever 172 by a pin 200. The movement of the link 192 is transferred to a step actuator 202 mounted on a pin 204 on the plate 190 by means of a block 206 on link 192 which is positioned to engage an adjusting screw 208 on one leg of the step actuator 202. The step actuator 202 has a step 210 on the side of the other leg of the step actuator 202 which is positioned to engage one leg of a trip actuator 212. The clockwise pivotal motion of the step actuator 202 will move the step 210 out of the path of motion of the trip actuator 212. The trip actuator 212 is pivotally mounted on a pin 214 on the plate 190 and is biased by a spring 216 for clockwise rotation about the pin 214. The trip actuator 212 also is connected to the actuating rod 182. On release of the trip actuator 212 from the step 210, the trip actuator 212 will rotate clockwise about the pin 214 pushing the actuator rod 182 against the bracket 186 rotating the sleeve 188 about shaft 52 and the cam roller 182 out of the path of motion of the extension 70 on the jaws 56a. It should be noted that the upward motion of the conveyor assembly 42 and the closing of the clamp 56 are timed so that the conveyor assembly reaches its upward position at approximately the same time as the clamp 56 is closed on the wire lengths 12 and 14.

The trip mechanism 180 is reset for the next cycle of motion by the return motion of the linkage assembly 162. As the lever 172 rotates back to the starting position, the links 192 will pivot counter clockwise about pin 198. An adjustable reset pin 199 on the link 192 will engage the trip actuator 212 and move the trip actuator to a position in line with step 210 on step actuator 202. The step actuator 202 is biased by means of a spring 203 toward the trip actuator 212. In this regard, the spring 203 is positioned in a recess 205 in the actuator 202 and a recess 207 in a fixed pin 209.

Timing of the operation of the trip mechanism can be adjusted by means of an adjustment screw 165 provided on the bracket 170. The adjustment screw 165 is set to close the clamp 56 just prior to cutting of the wire lengths 12 and 14. Positive engagement of the end of the rocker arm 164 with the screw 165 is provided by means of a spring biased plunger 167 positioned in an aperture provided on the other side of the bracket 170.

CONVEYOR ASSEMBLY DRIVE SYSTEM

The conveyor chains 54 are driven in a step-by-step manner by means of a clutch 78 which is connected to the motor 80 for the cutting and stripping machine 16. The motor 80 is connected to the clutch 78 through a speed reducing chain-sprocket drive arrangement as shown in FIG. 4 which includes a motor drive sprocket 82 connected to a first driven sprocket 84 mounted on a shaft 85 by a chain 86; a second drive sprocket 88 connected to the shaft 85 and to a second drive sprocket 90 mounted on a shaft 91 by a chain 92; and a third drive sprocket 94 connected to the shaft 91 and to a clutch sprocket 96 by a chain 98. The tension in chain 98 is maintained by an idler sprocket 99 mounted on an arm 100 on bracket 46 and biased by a spring 101 into engagement with the chain 98. The drive sprocket 102 for the clutch 78 is connected to the shaft 52 for the sprockets 50b by a fourth drive sprocket 103 secured to shaft 52 and a chain 104. The motor 80 operates continuously while the machine 16 is running providing a constant drive to the clutch sprocket 96.

The constant motion of the motor 80 is converted to step by step motion in the conveyor chains 54 by means of the clutch 78. As seen in FIGS. 6, 7, and 8, the clutch 78 includes a shaft 106 which is journalled for rotation in the plates 107. The clutch sprocket 96 is mounted for free rotation on roller bearings 108 provided on the shaft 106. The clutch drive sprocket 102 is secured to the shaft 106. The motion of the sprocket 96 is transferred to the shaft 106 by means of a pin 110 provided in a sleeve 112 which is secured to the shaft 106. The pin 110 is biased by means of a spring 114 into engagement with the face of a one toothed cam plate 116 which is secured to the sprocket 96. The pin 110 is moved out of the path of motion of the cam plate 116 by means of a release lever 118 which is pivotally mounted on a shaft 120 provided on the plates 107 and biased by a spring 109 into engagement with sleeve 112. The pin 110 includes a groove 122 in its upper surface and a cam surface 124 on one side of the groove 122. The release lever 118 includes a cam surface 126 which is positioned to engage the cam surface 124 to move the pin 110 against the bias of the spring 114 away from the groove 122 in the pin 110.

The release lever 118 is pivoted about the pin 120 and out of the path of motion of the pin 110 by means of a link mechanism 128 which is connected to the linkage assembly 162 by an actuating arm 132. The link mechanism 128 includes a trip lever 134 pivotally mounted on a shaft 136 on the plates 107 and an arm 138 pivotally connected to the release lever 118 by a pin 140. The trip lever 134 is connected to the arm 138 by a pin 142 which is positioned within an L-shaped groove 144 provided in the arm 138. The arm 138 is biased by means of a spring 146 against the pin 142.

The L-shaped groove 144 provides for the release of the arm 138 from the motion of the trip lever 134 to allow the release lever 118 to move back to a position in the path of motion of pin 110 in one revolution and prior to the time the linkage assembly goes through a complete cycle. This is accomplished by means of a release arm 148 which is pivotally mounted on the shaft 120 and includes a boss or finger 150 which is positioned to engage the arm 138. The release arm 148 is moved outward against the arm 138 by means of a cam or lobe 149 provided on sleeve 112.

OPERATION OF THE CLUTCH

In operation, the arm 138 is moved downward by the motion of the lever 134. The release lever 118 will be disengaged from the pin 110, allowing the pin 110 to move into engagement with the cam plate 116. When the pin 110 engages the tooth or step in plate 116, the motion of the plate 116 will be transferred to the sleeve 112 and the shaft 106. The initial motion of the sleeve 112 will move the cam 149 into engagement with the release arm 148 pivoting the lever clockwise about shaft 120 into engagement with the arm 138. The arm 138 will pivot about the pin 140 moving the L-shaped groove 144 into alignment with the pin 142. As soon as the pin 142 is aligned with the vertical section of the L-shaped groove, the arm 138 will be free to move upward due to the bias of the spring 109 allowing the lever 118 to move into engagement with the sleeve 112 in the path of motion of the groove 122 in the pin 110.

Means are provided for stopping the clutch after one complete revolution of the shaft 106. Such means is in the form of a stop lever 154 pivotally mounted on the shaft 120 and biased by means of a spring 155 into engagement with the sleeve 112. The stop lever includes a groove 156 which is positioned to engage a stop 158 provided on sleeve 112. The stop lever 154 is released from the stop 158 by means of a pin 160 on release lever 118 which is positioned to engage the end of the stop lever 154. In the initial motion of the lever 118, the pin 160 will engage the stop lever 154 pivoting the lever about the shaft 120. The groove 156 should clear the stop 158 at about the time the release lever 118 clears the cam 124 on the pin 110.

The clutch 78 is actuated by the final motion of the rocker arm 164 as the wire is cut or severed. The rocker arm 164 is connected to the clutch 78 by means of the actuating rod 132 which is connected to a link 220 on the shaft 166 and to the actuator 134 in the clutch 78. Means are provided for delaying the operation of the clutch 78 to allow for stripping of the ends of the wire before movement of the clamps 56. Such means is provided by the cam plate 116. As soon as the clutch 78 is tripped, the pin 110 will engage the face of the cam plate 116. The conveyor chain 54 will not advance until the step in the cam plate 116 engages the pin 110. During this time delay, the ends of the wire will be stripped. The clamp 56 is then moved away from the cutting and stripping machine 16 and the next clamp 56 aligned with the wire at the machine 16. Each step of motion of the clamps 56 will also align the wire lengths with the terminal applicators.

WIRE STABILIZER ASSEMBLY

Means are provided for stabilizing the ends of the electric wire lengths 12 and 14 for terminal application at each of the terminal applicators 18 and 20. Such means, as seen in FIGS. 11 through 13, includes a pair of clamps 222 and 224 provided on plates 226 on the side of the housing 48. Each of the clamps includes a pair of jaws 222a and 222b, 224a and 224b, respectively. A gear 228 is secured to each of the jaws and is pivotally mounted on a corresponding pin 230. The gears 228 on each pair of jaws are in mesh and one of the gears of each pair is operatively positioned to engage a rack 232 provided on a rod 234 mounted for longitudinal movement on the side of the housing 48. The rod 234 is biased by means of a spring 236 into engagement with a cam 238 provided on the side of one of the sprockets 50b. Cam 238 is provided with two lobes 240 to open and close each pair of jaws in each half revolution of the sprocket 50b. As soon as the sprocket starts to rotate, the rod 234 will be moved to the left rotating the gears 228a counter clockwise rotating the jaws 222a and b and 224a and b to an open position. The jaws are rotated far enough to be out of the path of motion of the electric wire lengths 12 and 14. As the sprocket 50 completes one-half revolution, the rod 234 will move to the right due to the bias of spring 236 reversing the motion of the gears 228 and closing the jaws on the ends of the electric wire lengths 12 and 14.

Means are provided on the frame 40 for separating the wire length 14 from the wire length 12 after application of an electric terminal to the wire length 14. Such means is in the form of a cam plate 242 secured to the frame 40 and angled upward at an angle from the frame. The edge 244 of the plate 242 is positioned at a distance greater than the length of the upper wire length 12 from the clamps 56. The plate 242 will engage the terminal on the end of the electric wire length 14 and bend the wire length 14 backwards leaving the end of the wire length 12 free for movement into the terminal applicator 20. An electric terminal is then applied to the end of the wire length 12.

On completion of the application of electrical terminals to the electric wire lengths 12 and 14, the electric wire lengths 12 and 14 will be released from the clamps 56 by means of cam rollers 250 located on the end of housing 48. As the clamps 56 move about the sprocket 50b at the end of the conveyor assembly, the rollers 250 which are secured to the housing 48 will engage the extension 70 on the jaw 56a pivoting the jaws about the pins 60. The electric wire lengths 12 and 14 with the electric terminals attached will drop into the wire gatherer 256 located at the end of the frame 40.

In this regard, and referring to FIG. 1, the wire gatherer 256 is shown in the form of a trough provided along side of the frame 40 and at the end of the housing 48. A chute 260 is provided at the end of the trough for aligning the ends of long wire lengths in the trough 256. When the long wire lengths are released from the clamp assemblage 24, the ends of the wire lengths will drop into the chute 260. As the clamps 56 are moved to the to the terminal applicators the ends of the wire lengths will engage the corner 262 of the trough 256, bending the end so that it lies in the trough 256. When the other end of the wire lengths 12 and 14 is released from the clamp 56, they will drop into the portion of the trough at the end of the wire gatherer. As subsequent lengths of wire are dropped, they will fall into the trough in alignment with the previous wire lengths in the trough.

Resumé

The apparatus of this invention increases the efficiency of electric terminal application to the ends of stripped electric wire lengths. Accuracy in locating the cut and stripped wire lengths at the applicators is achieved by gripping the wire lengths 12 and 14 at a predetermined location prior to cutting and returning the clamps to predetermined locations with respect to the applicators after stripping. The accuracy in locating the clamps at precise positions with respect to the applicators is essential to the success of this apparatus. Noise in the operation of the apparatus is reduced by controlling the operation of the assembly through a mechanical linkage assembly. This assembly is operatively connected to the wire cutting and stripping machine to time the operation of the trip mechanism and clutch with the cutting and stripping of the electric wire lengths. The stripped ends of the cut and stripped wire lengths are stabilized for terminal application by clamps 222 and 224 which are actuated in response to the step by step motion of the conveyor.

I claim:

1. An apparatus for transferring electric wire lengths from a measuring, cutting and stripping machine to a terminal applicator, said apparatus comprising,
   a frame,
   a conveyor assembly mounted on said frame and including means for carrying the severed and stripped wire lengths from the machine to the terminal applicator,
   means for intermittently advancing the carrying means to the applicator in synchronism with the operation of the measuring, cutting and stripping machine,
   and means for moving said carrying means laterally to a predetermined position with respect to the applicator.

2. The apparatus of claim 1 wherein said carrying means includes a number of pairs of jaws biased to a closed position and said conveyor assembly includes means at each end of said conveyor assembly for opening said jaws.

3. The apparatus according to claim 1 wherein said advancing means comprises a clutch connected to said conveyor assembly and means connected to said clutch for initiating the operation of said clutch.

4. The apparatus according to claim 3 wherein said clutch includes means for delaying the advance of the carrying means until the end of the wire length has been stripped.

5. The apparatus according to claim 1 wherein said moving means comprises a pair of cam surfaces, one of said surfaces being located at a fixed distance from the machine and the applicator, the other of said surfaces being positioned to guide said carrying means into engagement with said first guide surface.

6. The apparatus according to claim 1 including a linkage assembly operatively connecting said advancing means to the machine.

7. The apparatus according to claim 1 including means for tripping the carrying means to grip the wire length prior to cutting the wire length.

8. The apparatus according to claim 1 wherein said carrying means includes a number of pairs of jaws mounted for pivotal movement toward and away from each other and a pair of springs operatively positioned to bias said jaws to a closed position.

9. The apparatus according to claim 1 including means for stabilizing the end of the wire length at the applicator.

10. The apparatus according to claim 1 including a wire gathering assembly.

11. In combination with a wire measuring, cutting and stripping machine and a pair of terminal applicators, an apparatus for carrying predetermined lengths of cut and stripped wire from the machine to the applicators, said apparatus comprising,
    a conveyor assembly having a plurality of clamps adapted to carry the wire lengths from the machine to the applicators,
    means for driving the conveyor assembly in a step-by-step manner,
    means for moving said clamps laterally to a predetermined position with respect to the applicators,
    and a linkage assembly operatively connected to the machine, the conveyor assembly and the driving means to coordinate the operation of the conveyor assembly and the drive means with the operation of the machine.

12. The combination according to claim 11 wherein said conveyor assembly includes a housing, a pair of conveyor chains mounted for movement in a parallel spaced relation on said housing, and a plurality of pins connected between said chains, said clamps being mounted on said pins for lateral movement with respect to the direction of motion of said chains.

13. The combination according to claim 12 wherein each of said clamps includes a pair of jaws each being mounted for pivotal movement on adjacent pins and a spring to bias said jaws to a closed position.

14. The combination according to claim 13 including means for tripping said jaws to a closed position.

15. The combination according to claim 11 wherein said conveyor assembly is mounted for pivotal movement.

16. The combination according to claim 11 including means for stabilizing the ends of the wire lengths at the applicators.

17. An apparatus for carrying cut wire lengths having stripped ends from a cutting and stripping machine to a number of terminal applicators, said apparatus comprising,
    a housing,
    a pair of conveyor chains mounted for movement in a parallel spaced relation,
    a number of pins connected between said chains,
    a number of clamps mounted on adjacent pairs of pins for lateral movement with respect to the direction of motion of said pins,
    means for locating said clamps at a predetermined position with respect to the cutting and stripping machine,
    and means for closing said clamps on said wire lengths prior to cutting.

18. The apparatus according to claim 17 wherein each of said clamps includes a pair of jaws, a rod supported in the jaws and a spring mounted on each end of the rod to bias the jaws to a closed position.

19. The apparatus according to claim 17 wherein said locating means includes means for locating said clamps at predetermined positions with respect to the applicators.

20. The combination of
a measuring, cutting and stripping machine for cutting and stripping predetermined lengths of electric wire,
a number of electric terminal applicators corresponding to the number of lengths of electric wire cut,
and a conveying apparatus for transferring the cut and stripped lengths of electric wire from said machine to said applicators,
said apparatus including,
a conveyor assembly having a pair of conveyor chains mounted for movement in a parallel spaced relation and a number of clamps mounted for lateral movement between said chains,
means for closing said clamps on said wire lengths prior to cutting,
means for locating said clamps at predetermined locations with respect to said machine and said applicators,
means for intermittently advancing said chains,
and means for synchronizing the operation of said closing means and said advancing means with the operation of said machine.

21. The combination according to claim 20 wherein said machine includes a pair of cutting blades and pair of stripping blades.

22. The combination according to claim 20 wherein said cutting blades and stripping blades are staggered.

23. The combination according to claim 20 wherein said conveyor assembly is mounted for pivotal movement and is operatively connected to said synchronizing means to move the next clamp out of the path of motion of the machine during the wire length measuring movement of the machine.

24. The combination according to claim 20 including means for stabilizing the ends of the wire lengths during terminal application.

25. The combination according to claim 20 including means for separating the ends of the electric wire lengths in the movement between applicators.

26. An apparatus for carrying cut wire lengths having staggered stripped ends from a cutting and stripping machine to a number of terminal applicators, said apparatus comprising,
a frame,
a conveyor assembly mounted on said frame, and having a pair of conveyor chains, pin means connected between said chains and a number of clamps mounted on said pin means for lateral movement with respect to the direction of motion of said pins,
means for moving said clamps to predetermined positions with respect to the machine and the applicators,
and means for closing said clamps on the wire lengths prior to cutting.

27. The apparatus according to claim 26 including means for opening said clamps to release the wire after terminal application.

28. The apparatus according to claim 26 including means for stabilizing the wire at the applicators.

29. The apparatus according to claim 26 wherein said conveyor assembly is mounted for pivotal movement on said frame.

* * * * *